UNITED STATES PATENT OFFICE.

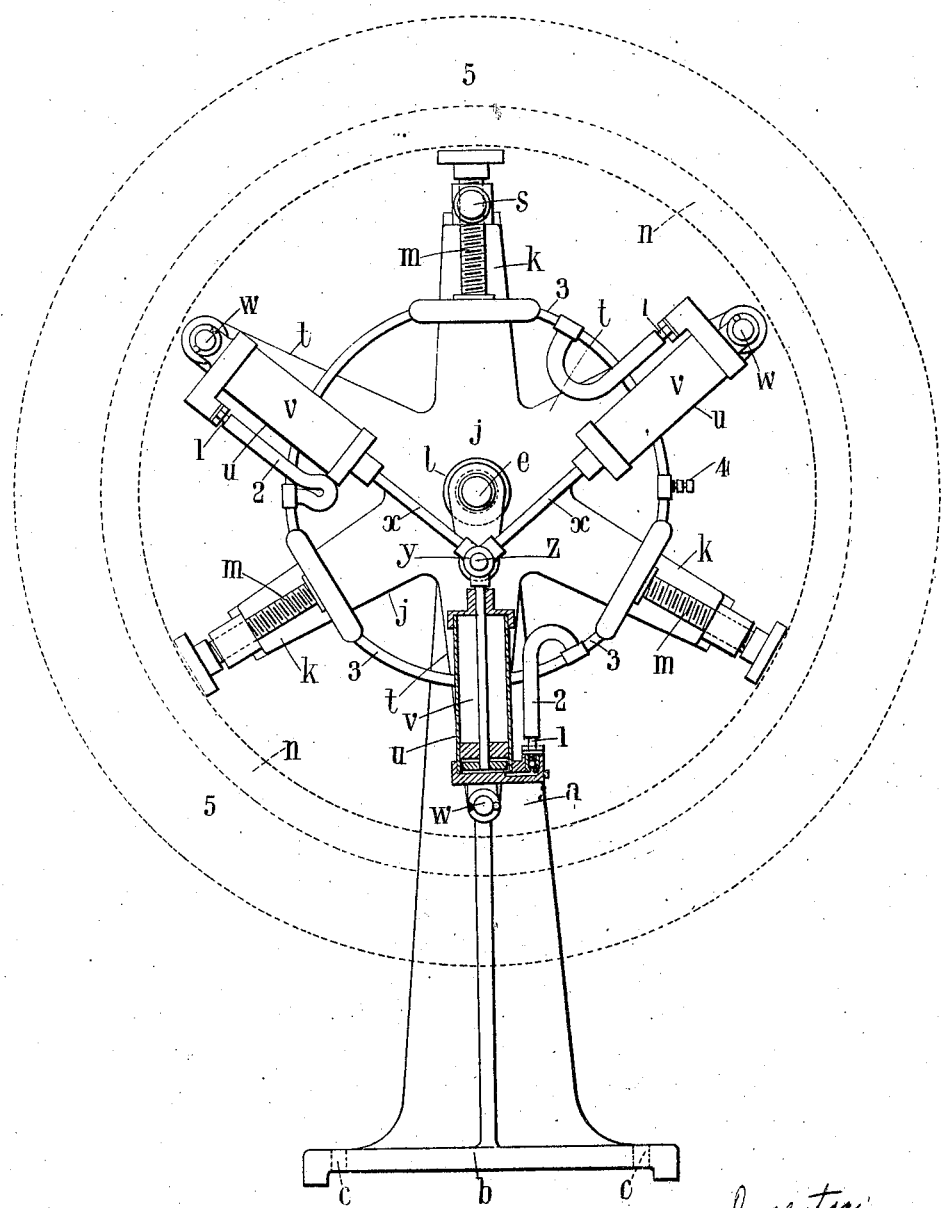

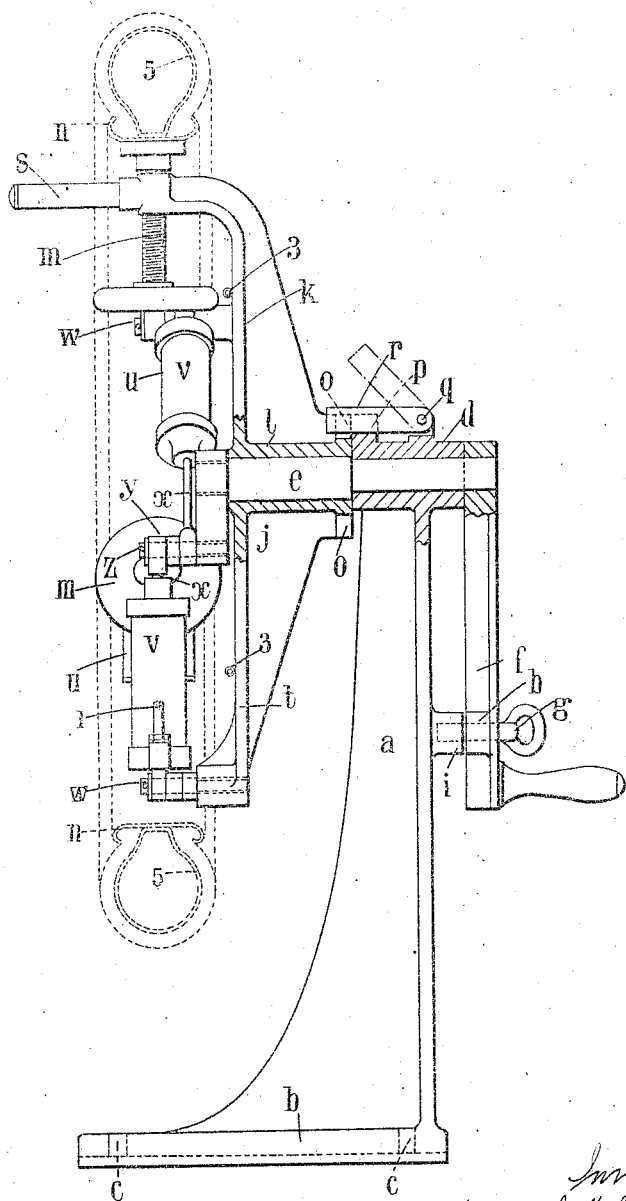

FREDERICK WILLIAM STANLEY, OF GRANGE-OVER-SANDS, ENGLAND.

MEANS FOR HOLDING AND INFLATING PNEUMATIC TIRES.

937,884.  Specification of Letters Patent.  Patented Oct. 26, 1909.

Application filed November 12, 1908. Serial No. 482,308.

*To all whom it may concern:*

Be it known that I, FREDERICK WILLIAM STANLEY, a subject of His Majesty the King of England, residing at Grange-over-Sands, in the county of Lancaster, Kingdom of England, have invented certain new and useful Improvements in Means for Holding and Inflating Pneumatic Tires, of which the following is a specification.

The object of my invention is to provide an appliance for holding pneumatic-tired wheels or rims while the tire is being repaired, or while a new tire is being fitted, and for holding the wheel or rim during inflation, and for inflating the tire, whether it is held on the appliance or not.

I will now fully explain my invention with reference to the accompanying drawings wherein:—

Figure 1 is a sectional elevation of an appliance designed to be bolted to a floor or the like, the wheel or rim being depicted in position thereon by dotted lines; and Fig. 2 is a similar view at right angles thereto.

The appliance represented comprises a frame or support *a* which carries the other components thereof. The frame *a* is provided with a base or flange *b* by which it is secured, as indicated at *c*, *c*, to the floor or the like, though, obviously, the base or flange *b* may as readily be secured to a wall or the like. On the frame or support *a* I provide a bearing sleeve *d* in which is mounted a crank shaft *e* which can be rotated therein or held against rotation in the manner hereinafter described. The crank shaft *e* is shown as being fitted with a handle *f* by which it may either be rotated in the sleeve *d* or it may be locked against rotation. This locking may be effected in various ways, but I have shown for this purpose a pin *g* which is passed through a hole *h* in the handle and enters a socket *i* in the frame or support *a*.

On the shaft *e* I rotatably mount a bracket *j* having three arms *k*, *k*, *k*, springing from a central hub *l*, on each of which I furnish a device *m* for engaging the rim or felly *n*, the device *m* being constructed as a screw clamp to afford adjustability. Of course there may be more or less than three arms *k*, *k*, *k* and all need not be fitted with a device *m*, which, in turn, need not be adjustable in every case. Further, the adjustable device may take other forms than that exemplified. Means are provided for locking the bracket to the frame and for this purpose I preferably provide the boss *l* with two or more slots *o*, and I provide the frame or support *a* with a slot *p*. To the sleeve *d* is hinged at *q* an arm *r*, the free end of which is adapted to engage and disengage the slot *p* and the slot *o* which may register therewith.

A handle *s* is provided on one of the arms *k* for rotating the bracket *f*. To the bracket *j* through the medium of other arms *t*, *t*, *t* like the arms *k*, *k*, *k*, or otherwise, is secured a single- or multiple-cylinder pump *u* whose piston rod or rods is or are connected to the crank-shaft *e*. A three-cylinder pump is shown, each cylinder *v* thereof being pivoted as indicated at *w* to an arm *t*, and its piston rod *x* connected as at *y* to the pin *z* of the crank of the shaft *e*. The pump *u* may be of any appropriate construction, such as that shown by the sectional view of the cylinder *v* in Fig. 1. The delivery nozzle 1 of each cylinder *v* is connected by a flexible pipe 2 to a common pipe 3 which is suitably supported upon the bracket *j* and whose delivery nozzle 4 is similarly or otherwise appropriately connected to the valve of the tire 5.

Having described the construction of the appliance I will now explain its use. Assuming the crank-shaft *e* is locked against rotation by the handle *f* and pin *g*, and supposing a tire is to be repaired or replaced, then the wheel or rim *n* is placed over the bracket *j* and engaged by the devices *m*, *m*, *m* thereon. The bracket *j* is secured so that it cannot rotate by means of the pin device *o*, *p*, *r*, and thus the whole is held stationary, though, of course, the wheel or rim *n* can be turned as required by displacing the pin *r* from the slots *o* and *p* as indicated by the dotted lines in Fig. 2 and turning the bracket *j* by the handle *s*, or by means of the wheel or rim *n* itself. Now assuming the repair or replacement is complete, and it is desired to inflate the tire 5, then the pin connection *o*, *p*, *r* of the bracket *j* is withdrawn so that the bracket *j* may be rotated as described, whereby the pump *u* rotates also, and thus its piston or pistons is or are caused to reciprocate to inflate the tire. Again, supposing it is desired to inflate a tire without mounting its wheel or rim on the appliance, then the bracket *j* is locked against rotation by the pin device *o*, *p*, *r*, and the pin *g* is withdrawn from the handle *f* whereupon, on turning the crank-shaft *e* thereby, the pump $u$ is operated to attain the desired end without the flexible connections 2, 2, 2 from the cylinders $v, v, v$ being twisted.

It will now be seen that by my invention I provide a very simple appliance for the purposes specified, and which, as already pointed out, may be adapted for fixed or portable use.

What I claim and desire to secure by Letters Patent of the United States is:—

1. The combination of a frame or support, a crank shaft mounted to rotate thereon, a bracket mounted to rotate on the crank shaft, means carried by the bracket for engaging a tire or wheel, and a pump carried by the bracket and operatively connected with the crank shaft.

2. The combination of a frame or support, a crank shaft mounted thereon, a bracket rotatably mounted on the crank shaft, means carried by the bracket for engaging a wheel or tire, means for locking the bracket to the frame or support, a pump operatively connected with the crank shaft and means for rotating the crank shaft.

3. The combination of a frame or support, a crank shaft mounted to rotate thereon, means for locking the crank shaft against rotation, a bracket mounted to rotate on the crank shaft, means for preventing the rotation of the bracket, means carried by the bracket for engaging a tire or wheel, and a pump carried by the bracket and operatively connected with the crank shaft.

4. The combination of a frame or support, a bracket supported thereby, means carried by the bracket for engaging a tire or wheel, a pump mounted on the bracket and means for operating the pump.

In testimony whereof I have hereunto subscribed my name.

F. WILLIAM STANLEY.

Witnesses:
 J. S. ARMES,
 FREDK. J. CHUELAND.